Nov. 8, 1927.
J. K. LANG
SEAT FOR WATER CLOSETS
Filed July 16, 1926
1,648,485
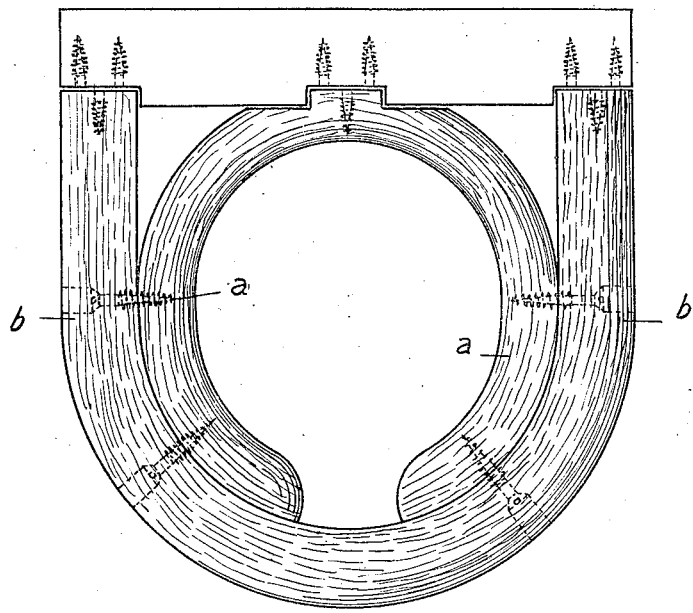
Inventor:

Patented Nov. 8, 1927.

1,648,485

UNITED STATES PATENT OFFICE.

JOSEF KARL LANG, OF KITZINGEN-ON-THE-MAIN, GERMANY.

SEAT FOR WATER-CLOSETS.

Application filed July 16, 1926, Serial No. 122,904, and in Germany April 1, 1926.

This invention relates to a seat for water-closets which is constructed so that the several seat-elements cannot detach the one from the other under the influence of the moistness. With this object in view the seat, according to the invention, is composed of two wooden-bows curved in horseshoe-shape and which are pushed the one over the other in opposite directions. It has been proposed to use wood-parts curved in bow-shape as seats for water-closets, these wooden-bows being however hingedly connected to the cross bar or rearboard of the seat by two wooden parts. In a seat of this construction the connecting-bars might get disconnected from the bow when the hinges get loose.

The figure illustrates a plan view of the seat.

In the seat for water closet according to the invention, the seat proper $a$ forms the felloe, the tire $b$ being formed by a bow of wood, the fibres of which are directed in opposite direction from those of the seat proper $a$. The felloe or seat $a$ is inserted into the tire or bow $b$ and the two elements are connected the one with the other by any convenient means or in any convenient manner.

The seat for water closet according to the invention is of great durability and presents a very large surface.

I claim:—

A seat for water closets of bent wood comprising in combination an inner bow of bent wood, and an outer bow of bent wood the fibres of the outer bow being directed in opposite direction from the fibres of the inner bow, and means for securely connecting the two bows the one with the other.

In testimony whereof I affix my signature.

J. KARL LANG.